US008439779B2

(12) United States Patent
Florczyk

(10) Patent No.: US 8,439,779 B2
(45) Date of Patent: May 14, 2013

(54) FRONT DERAILLEUR

(75) Inventor: Raymond Florczyk, Schwebheim (DE)

(73) Assignee: SRAM Deutschland GmbH (DE)

( * ) Notice: Subject to any disclaimer, the term of this patent is extended or adjusted under 35 U.S.C. 154(b) by 713 days.

(21) Appl. No.: 11/552,882

(22) Filed: Oct. 25, 2006

(65) Prior Publication Data

US 2007/0093327 A1    Apr. 26, 2007

(30) Foreign Application Priority Data

Oct. 25, 2005   (DE) .......................... 10 2005 050 988

(51) Int. Cl.
*F16H 9/00* (2006.01)
*F16H 59/00* (2006.01)
*F16H 61/00* (2006.01)
*F16H 63/00* (2006.01)

(52) U.S. Cl.
USPC .............................................. 474/82; 474/80

(58) Field of Classification Search .................... 474/80, 474/70, 78, 79, 81, 83
See application file for complete search history.

(56) References Cited

U.S. PATENT DOCUMENTS

| 3,730,012 | A | * | 5/1973 | Juy ................................ 474/82 |
| 3,890,847 | A | * | 6/1975 | Dian ............................... 474/80 |
| 4,229,987 | A | * | 10/1980 | Fujimoto ........................ 474/82 |
| 4,259,873 | A | * | 4/1981 | Nagano et al. .................. 474/82 |
| 4,279,605 | A | * | 7/1981 | Egami ............................. 474/82 |
| 4,305,712 | A |   | 12/1981 | Nagano |
| 4,323,357 | A | * | 4/1982 | Nagano ........................... 474/82 |
| 4,362,522 | A | * | 12/1982 | Huret ............................... 474/82 |
| 4,486,182 | A | * | 12/1984 | Coue ............................... 474/80 |
| RE31,854 | E | * | 3/1985 | Egami ............................. 474/82 |
| 4,529,395 | A | * | 7/1985 | Coue ............................... 474/82 |
| 4,586,913 | A |   | 5/1986 | Nagano |
| 4,613,319 | A | * | 9/1986 | Nagano .......................... 474/80 |
| 4,627,827 | A | * | 12/1986 | Juy ................................. 474/80 |
| 5,152,720 | A | * | 10/1992 | Browning et al. .............. 474/80 |
| 5,389,043 | A | * | 2/1995 | Hsu ................................. 474/80 |
| 5,496,222 | A | * | 3/1996 | Kojima et al. .................. 474/80 |
| 5,620,384 | A | * | 4/1997 | Kojima et al. .................. 474/82 |
| 5,624,336 | A | * | 4/1997 | Kojima .......................... 474/82 |

(Continued)

FOREIGN PATENT DOCUMENTS

| DE | 17 82 592 U | 2/1959 |
| DE | 21 27 880 A1 | 12/1971 |

(Continued)

*Primary Examiner* — William A Rivera
*Assistant Examiner* — Henry Liu
(74) *Attorney, Agent, or Firm* — Milan Milosevic; Lisa Serdynski; Steven Courtright

(57) ABSTRACT

A front derailleur that includes a derailleur housing having a tubular clamp and a chain guide coupled to parallelogram arms. A pivotal transfer element transfers the shifting motion through a pull cable to the chain guide. The shifting momentum is supported by a derailleur housing having a support extension extending in a support direction along the bicycle frame beyond the hinge of the tubular clamp. The transfer element is pivotally mounted to the derailleur housing by a pivot pin. The return spring is disposed around the pivot pin and is supported on a spring stop of the derailleur housing. The return spring is partially surrounded by a spring cover, which is integrated into the derailleur housing, all of which is protected from dirt by a second covering. The bores for accepting the adjustment screws, which are inclined relative to the frame tube in order to improve accessibility, are located in the spring cover.

16 Claims, 5 Drawing Sheets

U.S. PATENT DOCUMENTS

| | | | |
|---|---|---|---|
| 5,816,966 A * | 10/1998 | Yang et al. | 474/82 |
| 6,099,425 A * | 8/2000 | Kondo | 474/82 |
| 6,146,298 A | 11/2000 | Nanko | |
| 6,234,927 B1 * | 5/2001 | Peng | 474/82 |
| 6,270,124 B1 * | 8/2001 | Nanko | 285/15 |
| 6,341,538 B1 * | 1/2002 | Takachi | 74/502.6 |
| 6,629,903 B1 * | 10/2003 | Kondo | 474/82 |
| 6,923,740 B2 * | 8/2005 | Nanko | 474/82 |
| 6,962,544 B2 * | 11/2005 | Nanko | 474/80 |
| 7,014,584 B2 * | 3/2006 | Nanko et al. | 474/80 |
| 7,186,194 B2 * | 3/2007 | Nankou | 474/80 |
| 7,438,657 B2 * | 10/2008 | Nakai et al. | 474/80 |
| 2003/0100393 A1 * | 5/2003 | Nanko | 474/80 |
| 2004/0127314 A1 | 7/2004 | Nanko | |
| 2004/0185975 A1 | 9/2004 | Chen | |

FOREIGN PATENT DOCUMENTS

| | | |
|---|---|---|
| DE | 29 49 377 A1 | 6/1980 |
| DE | 34 29 276 A1 | 3/1985 |
| DE | 200 09 533 U1 | 10/2000 |
| DE | 201 17 994 U1 | 1/2002 |
| EP | 0 875 445 A | 11/1998 |
| EP | 1 031 504 A | 8/2000 |
| EP | 1 040 991 A | 10/2000 |
| EP | 1 040 992 A | 10/2000 |
| EP | 1 147 978 A | 10/2001 |
| EP | 1 314 636 A2 | 5/2003 |
| EP | 1 433 696 A | 6/2004 |
| GB | 920 185 | 3/1963 |

* cited by examiner 15  18  26  8  27  5  19  8

FRONT DERAILLEUR

BACKGROUND OF THE INVENTION

The present invention relates to bicycle front derailleurs and more particularly to a front derailleur including a housing having a support extension extending in a support direction along the bicycle frame beyond a hinge of a tubular clamp.

The load-bearing element of a bicycle front derailleur is a housing part that is connected to a tubular clamp which fastens the housing part to a bicycle frame. The housing part is also connected to a chain guide movable to shift the chain between various chainrings. The shifting motion is initiated in a parallelogram mechanism by a rotating part connected to a pull cable.

EP 1 314 636 A2 discloses a front derailleur that includes a fixed member having a pivotable clamp, a chain guide and a parallelogram having two parallelogram arms. The parallelogram movably couples the chain guide to the fixed member. For this purpose, two pivot points are located on the fixed member, allowing a pivoting movement of both arms of the parallelogram member. The shifting motion is initiated by pulling a pull cable connected to one of the parallelogram arms in the direction of the larger chainring. The shifting force in the other direction is provided by a return spring. The shifting forces for shifting the chain from a small chainring to a neighboring larger chainring are considerably greater than in the other direction. To shift the chain to a larger chainring, the return spring must also be wound up. The torque introduced on the derailleur by the pull cable is supported by the relatively thin fixed member and the clamp on the bicycle frame. This requires a correspondingly high-grade material for the fixed member and the clamp and a firm clamping on the frame, which may damage the frame surface.

SUMMARY OF THE INVENTION

An object of the present invention is to provide a front derailleur having a fixed part that provides a better support for the derailleur on the bicycle frame, while using a lighter, less stiff material. The production and assembly of the front derailleur of the present invention is improved, as well as the attachment of the front derailleur to the bicycle frame. Another object of the invention is to provide a covered return spring that is protected from dirt. Another object of the invention is to provide easily accessible adjustment screws for the adjustment stops of the front derailleur.

The present invention provides a front derailleur that includes a derailleur housing that includes a support extension extending in a support direction along a bicycle frame beyond a hinge of a tubular clamp. The front derailleur generally includes the derailleur housing, a transfer element, a chain guide and a parallelogram mechanism movably coupling the chain guide to the derailleur housing. The transfer element initiates the gear shifting motion. The parallelogram mechanism includes first and second parallelogram arms. The first parallelogram arm is integrated with the transfer element and the second parallelogram arm is a swing element. The support extension has axially aligned pivot points at a distance from the clamp hinge on the housing for coupling the swing element. The support extension also includes a bore for a pivot pin that runs parallel to the pivot points. A return spring is disposed around the pivot pin and is supported on a spring stop on the support extension. To achieve various initial tensions of the return spring, additional spring stops may be provided. The return spring is at least partially covered by a spring cover. The spring cover may be integrated with the derailleur housing. Further, the spring cover may include bores for receiving adjustment screws having threads that are inclined relative to the bicycle frame. The transfer element, which may be pivoted about the pivot pin, is turned counter-clockwise by a pull cable that engages a lever portion and is pulled upward in its installed position. The chain guide, carried by the swing element, is thereby moved over the parallelogram arm in the direction of the larger chainring. In the process of shifting from a larger chainring to a smaller chainring, the transfer element is rotated clockwise by the return spring. A second lever portion is also located on the transfer element to connect the pull cable to the transfer element such that the pull cable is pulled downwards instead of upwards.

The hinge of the tubular clamp, as well as the thread or fastening means such as a nut for clamping the tubular clamp, is located on the side of the derailleur housing facing the bicycle frame. The derailleur housing, which includes the support extension, allows an optimal support of the shifting momentum on the bicycle frame and displays improved clamping behavior as well as an increased resistance to twisting on the bicycle frame, as compared to the prior art.

Like the tubular clamp, the recommended derailleur housing is also made from a lighter material, for example, aluminum, and may be produced as a cast aluminum part in a one-step process.

These and other features and advantages of the invention will be more fully understood from the following description of a certain embodiment of the invention, taken together with the accompanying drawings.

DETAILED DESCRIPTION

Figure 1:
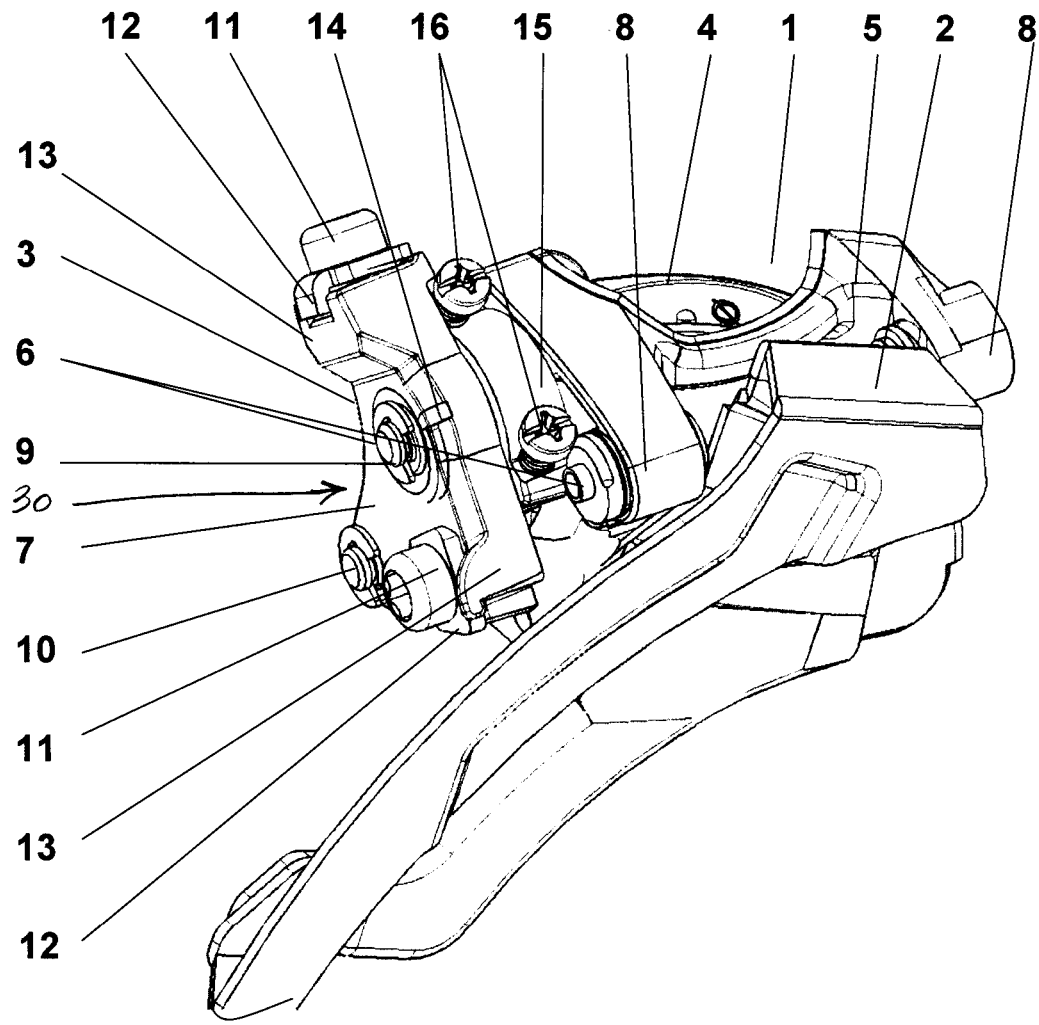
FIG. 1 is a perspective view of a front derailleur in accordance with one embodiment of the present invention.

FIGS. 1-5 illustrate a front derailleur 1 in accordance with one embodiment of the present invention. Looking to FIG. 1, the front derailleur 1 generally includes a chain guide 2, a transfer element 3, a tubular clamp 4, and a derailleur housing 5. The front derailleur 1 further includes a parallelogram mechanism 30 for movably coupling the chain guide 2 to the derailleur housing 5. The parallelogram mechanism 30 includes first and second parallelogram arms 7, 21, see FIG. 2. The derailleur housing 5 includes attachment points 6 for the two parallelogram arms. The first parallelogram arm 7 is integrated with the transfer element 3 and the second parallelogram arm is a swing element 21. The derailleur housing 5 includes a clamp hinge 17 for hingedly connecting the tubular clamp 4 to the housing 5, two pivot points 8 for receiving the swing element 21 and a pivot pin 9 running parallel thereto for pivotally coupling the transfer element 3. The distance between the pivot pin 9 and a coupling pin 10 defines the length of the parallelogram arm 7 on the transfer element 3. The transfer element 3 includes two lever portions 13, each having a clamp screw 11 and a clamping portion 12, to provide alternative methods of fastening a pull cable that may be pulled upwards or downwards. A return spring 14 is disposed around the pivot pin 9 to bias the transfer element 3 in the clockwise direction. A spring cover 15 is integrated with the derailleur housing 5 to protect the return spring 14 from dirt. The spring cover 15 also includes bores for receiving adjustment screws 16 that define the range of motion of the chain guide 2. The adjustment screws 16 are inclined relative to the orientation of the bicycle frame in the direction of the chain guide 2 to facilitate the adjustment process.

Figure 2:
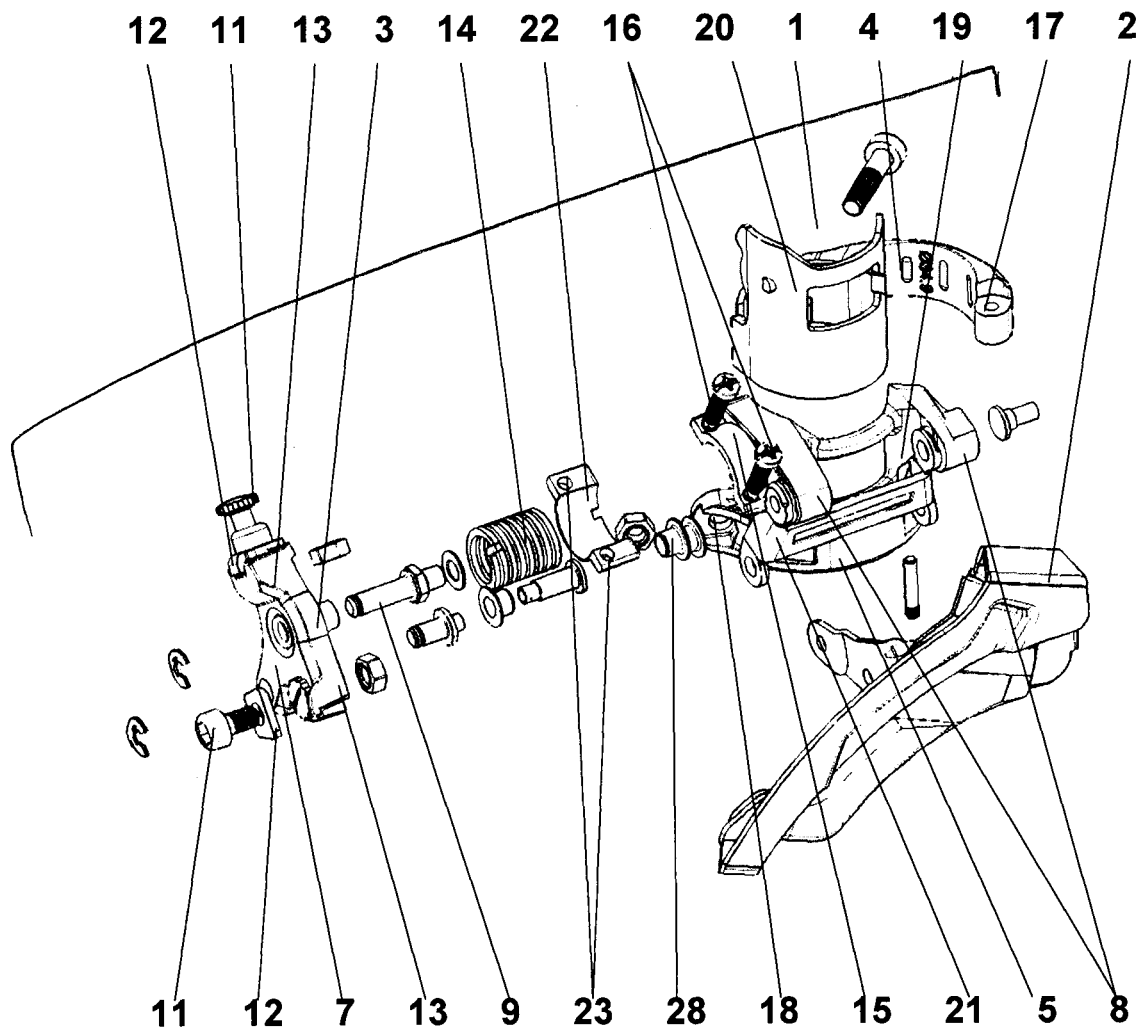
FIG. 2 is an exploded view of the front derailleur of FIG. 1.

Looking to FIG. 2, the derailleur housing 5 includes the clamp hinge 17 of the tubular clamp 4 and the fastening bore 18 for closing the tubular clamp 4. The derailleur housing 5 includes a support extension 19 that extends in a support direction along the bicycle frame beyond the region of the clamp hinge 17 of the tubular clamp 4. This configuration allows the shifting forces that are introduced by the pull cable onto the transfer element 3 in a counterclockwise direction to be better supported on the bicycle frame. Additionally, this allows attachment of the front derailleur 1 to even short tubes, typically used on bicycles with suspended drive wheels, permitting uniform operation of the chain guide 2. The position of the pivot pin 9 on the support extension 19 is selected such that the first coupling pin 10 of the chain guide 2 on the first parallelogram arm 7, when the chain guide 2 is in a retracted position, is located at the level of the clamp hinge 17 or the tubular clamp 4.

The front derailleur 1 may include an adapter element 20 to allow the derailleur 1 to be mounted on different bicycle frame diameters and to protect the bicycle frame surface during the clamping process. The adapter element 20 has an outer contour that corresponds to an inner contour of the derailleur housing 5 or to the support extension 19. The adapter element 20 may be made from an elastic material that allows the adapter element 20 to be snapped over the bicycle frame multiple times without deterioration.

The support extension 19, in an upper region, includes the two pivot points 8 for receiving the swing element 21 which forms the second parallelogram arm. At least one bushing 28 is provided for easily accessible mounting of the swing element 21. The return spring 14 is enclosed by the spring cover 15 and the protective covering 22. The spring cover 15 is integrated with the support extension 19 and forms the seat for the adjustment screws 16, which are inclined in the direction of the chain guide 2. The protective covering 22 is may be made of an elastic material and has bores 23 for receiving the adjustment screws 16. To protect the adjustment screws 16 from unintentional twisting, the diameter of the bores 23 is smaller than the outer diameter of the threads of the adjustment screws 16. The transfer element 3 pivots about the pivot pin 9 when a shifting movement is introduced onto one of the lever portions 13 by the pull cable. The pull cable is clamped firmly onto the respective lever portion 13 by a clamp screw 11 and a clamping piece 12. A second lever portion 13 is provided to allow the pull cable to be pulled in the upward direction as well as in the downward direction, depending on the geometry of the frame.

Figure 3:
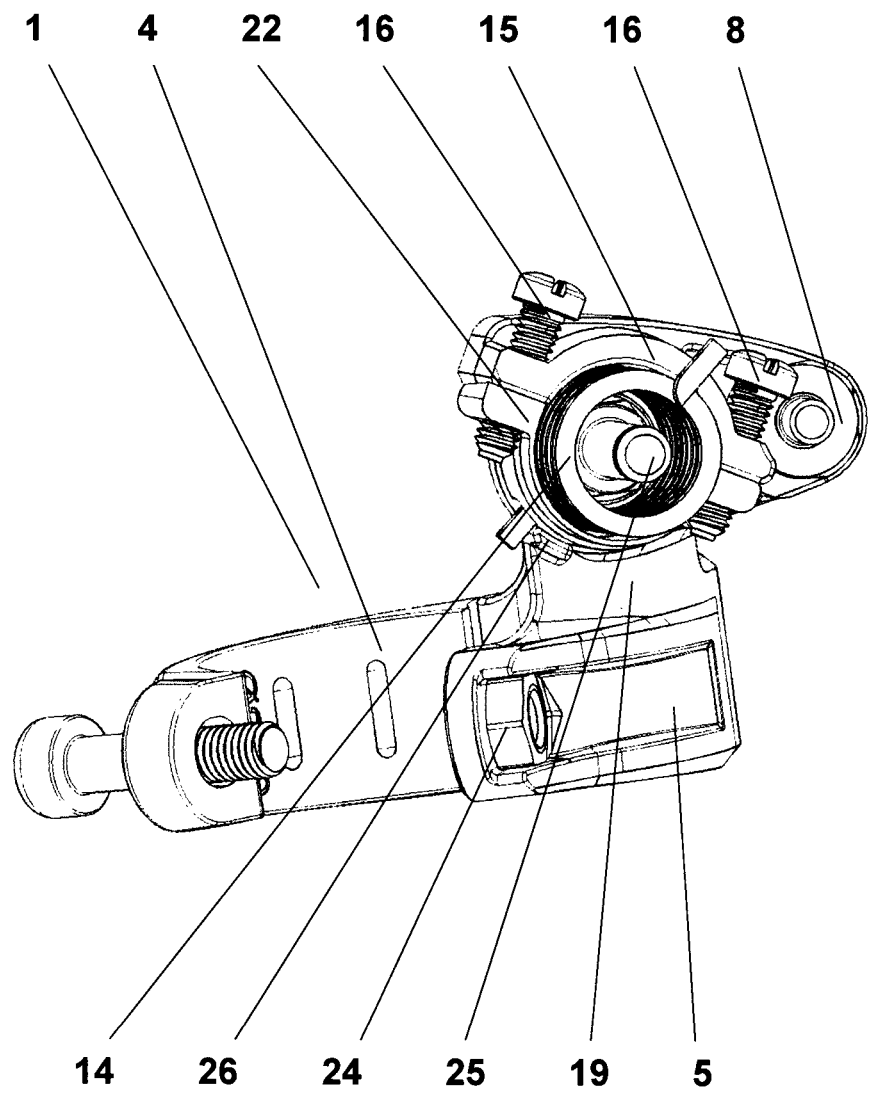
FIG. 3 is a perspective view of the front derailleur of FIG. 1 without a transfer element and a chain guide.

Looking to FIG. 3, the tubular clamp 4 is mounted to the bicycle frame by closing the tubular clamp 4 and inserting a screw into the fastening bore 18 and a fastening nut 24. The fastening nut 24 is received by a corresponding contour on the derailleur housing 5 and secured against twisting and a loss of material deformation of the derailleur housing 5. The derailleur housing 5 includes the support extension 19 disposed beyond the region of the clamp hinge 17 of the tubular clamp 4. The pivot point 8 is disposed on the upper region of the support extension 19 and has a bore for the pivotal connection of the swing element. Running parallel to this bore is the bore or thread of the pivot pin recess 25 for the pivot pin 9 on which the transfer element 3 is located. The return spring 14, which abuts against the support extension 19 by way of the spring stop 26, is arranged around the pivot pin recess 25. The return spring 14 is protected against dirt by the spring cover 15 and the protective covering 22. The spring cover 15 includes both adjustment screws 16, which are inclined in the direction of the chain guide. These adjustment screws 16 are secured against twisting in the corresponding bores in the protective covering 22, which may be made of an elastic material. The diameter of the bores 23 in the protective covering 22 is less than the outer diameter of the threads of the adjustment screws 16, which prevents an unintentional twisting of the adjustment screws 16.

Figure 4:
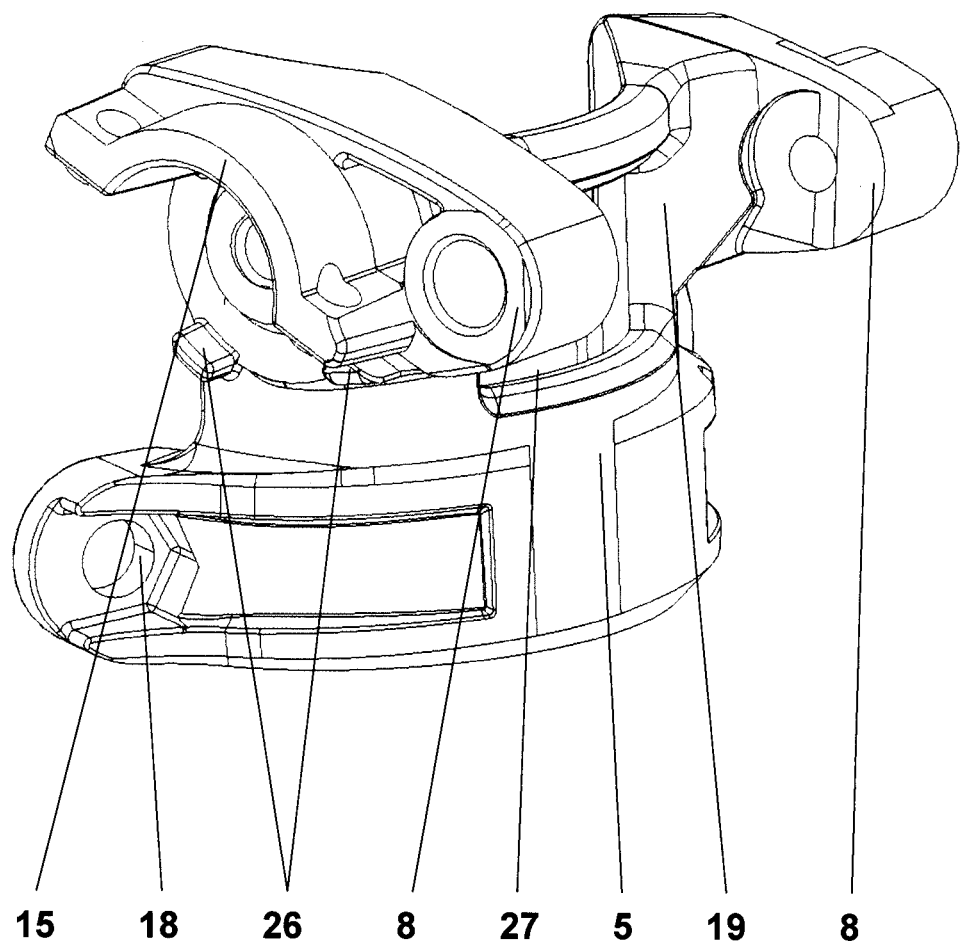
FIG. 4 is a perspective view of a derailleur housing of the front derailleur of FIG. 1.

Looking to FIG. 4, the pivot points 8 and the bushings 28 are disposed in the upper region of the support extension 19. To accept the bushing 28, the bore diameter of the bearing point on the first pivot point 8 near the spring cover 15 is greater than the bore diameter on the other pivot point 8. The two spring stops 26, which allow different degrees of initial tension of the return spring, are located below the spring cover 15. The spring cover 15, which is inclined relative to the orientation of the frame tube, forms the base for the adjustment screws 16. In order to reduce weight, the support extension 19 has a recess 27, which is also located in the same place on the adapter element 20.

Figure 5:
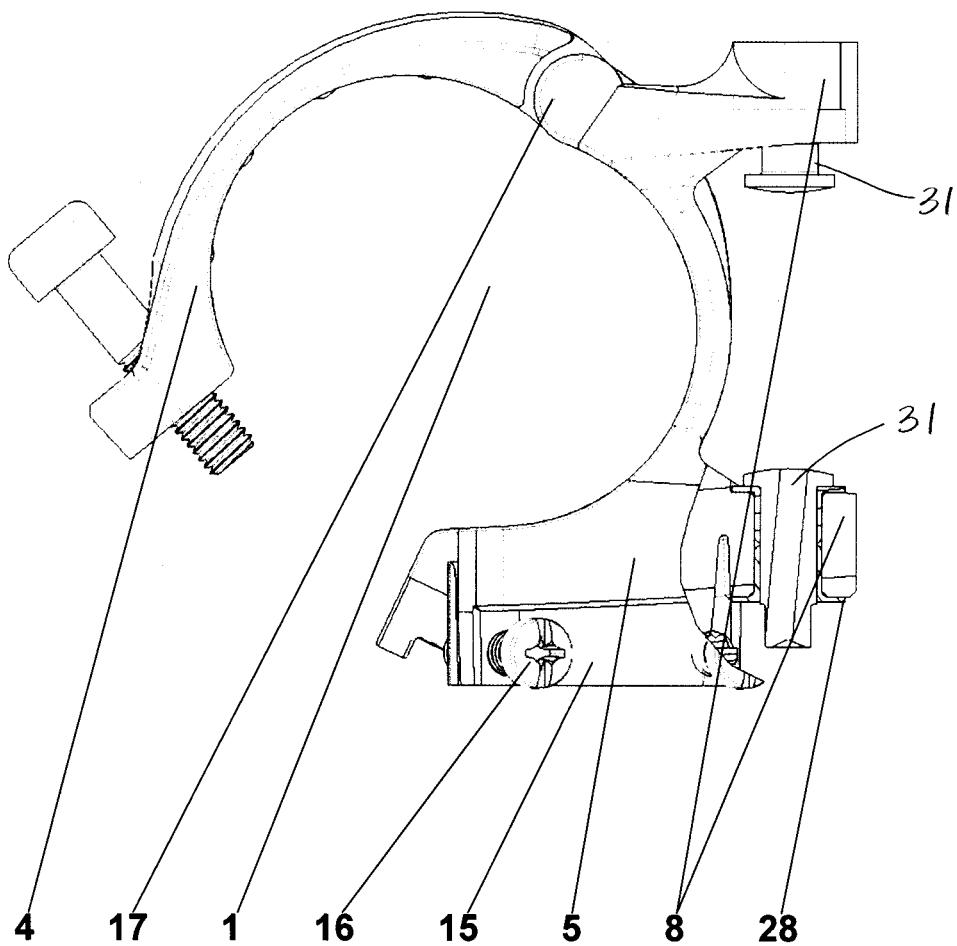
FIG. 5 is a partial cross-sectional view of the mounting of a pivot on the derailleur housing of FIG. 4.

Looking to FIG. 5, the swing element 21 is coupled to both pivot points 8 by one bolt 31 each. The bolt 31 located in the vicinity of the spring cover 15 is mounted in the bushing 28 because the strongest forces occur here, introduced by the chain guide 2 on the support extension 19 by the swing element 21. The adjustment screws 16 screwed into the spring cover 15 are inclined relative to the acceptance direction of the bicycle frame as defined by the derailleur housing 5 and the tubular clamp 4. The clamp hinge 17 allows a wide opening of the tubular clamp 4 and therefore an easy installation of the front derailleur 1 on the bicycle frame.

While this invention has been described by reference to a certain embodiment, it will be understood that numerous changes could be made within the spirit and scope of the inventive concepts described. Accordingly, it is intended that the invention not be limited to the disclosed embodiments, but that it include the full scope permitted by the language of the following claims.

What is claimed:

1. A front derailleur mountable to a bicycle frame comprising:
   a housing mountable to the bicycle frame;
   a chain guide for receiving and laterally displacing a chain;
   a parallelogram mechanism having first and second parallelogram arms movably coupling the chain guide to the housing at parallelogram arm attachment points on the housing;
   a transfer element pivotably connected to the housing at a transfer element pivot point extending parallel to at least one of the parallelogram arm attachment points, the transfer element operatively connected to the parallelogram mechanism to actuate the chain guide;
   a return spring biasing the transfer element; and
   a tubular clamp for mounting the housing to the bicycle frame,
   the housing having a clamp hinge and a support extension extending in a support direction a distance along the bicycle frame length above the region of the clamp hinge, the support extension including at least one of the parallelogram arm attachment points and the transfer element pivot point, the support extension circumferentially abutting the bicycle frame the distance from above the clamp hinge along the bicycle frame to the at least one of the parallelogram arm attachment points and the transfer element pivot point.

2. The front derailleur according to claim 1 wherein the support extension includes a spring cover to protect the return spring disposed around the transfer element pivot point, the spring cover integrated with the support extension.

3. The front derailleur according to claim 2 wherein the spring cover includes a seat for receiving at least one adjustment screw.

4. The front derailleur according to claim 3 wherein the adjustment screw is inclined toward the chain guide to facilitate the adjustment thereof.

5. The front derailleur according to claim 4 wherein the spring cover partially surrounds the return spring and a protective covering covers the remaining portion of the return spring.

6. The front derailleur according to claim 5 wherein the support extension includes at least two spring stops to adjust the initial tension of the return spring.

7. The front derailleur according to claim 5 wherein the protective covering is supported on at least one of the spring stops and on the housing, the protective covering including a bore for receiving the adjustment screw.

8. The front derailleur according to claim 5 wherein the protective covering is supported on the housing, the protective covering including a bore for receiving the adjustment screw.

9. The front derailleur according to claim 7 wherein the protective covering is made from an elastic material and the bore for receiving the adjustment screw is narrower than its outer thread diameter to frictionally resist rotation.

10. The front derailleur according to claim 1 wherein the support extension has a central region having a recess.

11. The front derailleur according to claim 1 wherein the transfer element includes the first parallelogram arm and at least one lever portion for attaching a pull cable.

12. The front derailleur according to claim 1 wherein the transfer element includes the first parallelogram arm and two lever portions for alternatively attaching a pull cable to pull the cable one of upwards and downwards.

13. The front derailleur according to claim 11 wherein the first parallelogram arm includes a pivot for connecting the chain guide to the first parallelogram arm, the pivot being disposed below the transfer element pivot point.

14. The front derailleur according to claim 11 wherein the adjustment screws define the pivotal range of the transfer element, the transfer element biased in the clockwise direction by the return spring.

15. The front derailleur according to claim 1 further comprising at least one elastic adapter element for adapting the front derailleur to various bicycle frame diameters, the adapter element snappable over the bicycle frame and having an outer contour corresponding to an inner contour of the front derailleur.

16. A front derailleur mountable to a bicycle frame comprising:
a housing mountable to the bicycle frame;
a chain guide for receiving and laterally displacing a chain;
a parallelogram mechanism having first and second parallelogram arms movably coupling the chain guide to the housing at parallelogram arm attachment points on the housing;
a transfer element pivotably connected to the housing at a transfer element pivot point extending parallel to at least one of the parallelogram arm attachment points, the transfer element operatively connected to the parallelogram mechanism to actuate the chain guide;
a return spring biasing the transfer element; and
a tubular clamp for mounting the housing to the bicycle frame,
the housing having a clamp hinge and a support extension extending in a support direction a distance along the bicycle frame length and abutting the bicycle frame a the distance from above the region of the clamp hinge, the support extension including and extending to at least one of the parallelogram arm attachment points and the transfer element pivot point,
the first parallelogram arm includes a pivot for connecting the chain guide to the first parallelogram arm, the pivot being disposed below the transfer element pivot point.

* * * * *